No. 864,126. PATENTED AUG. 20, 1907.
J. C. FLOWERS.
GEARING.
APPLICATION FILED JAN. 26, 1907.
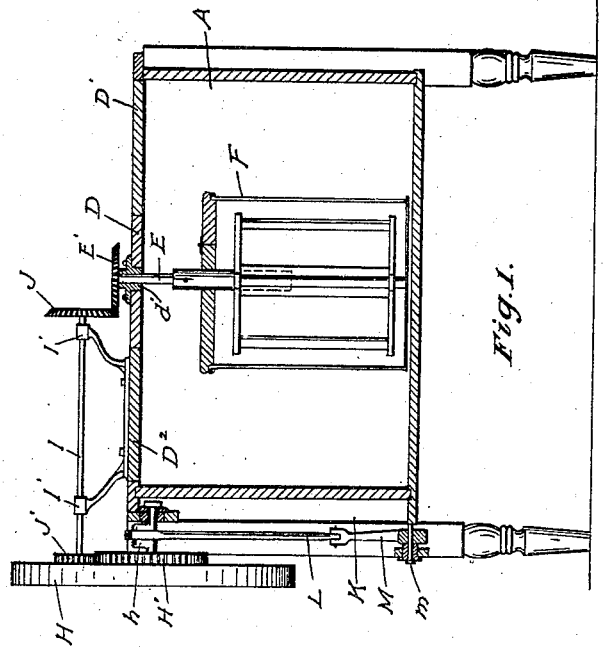
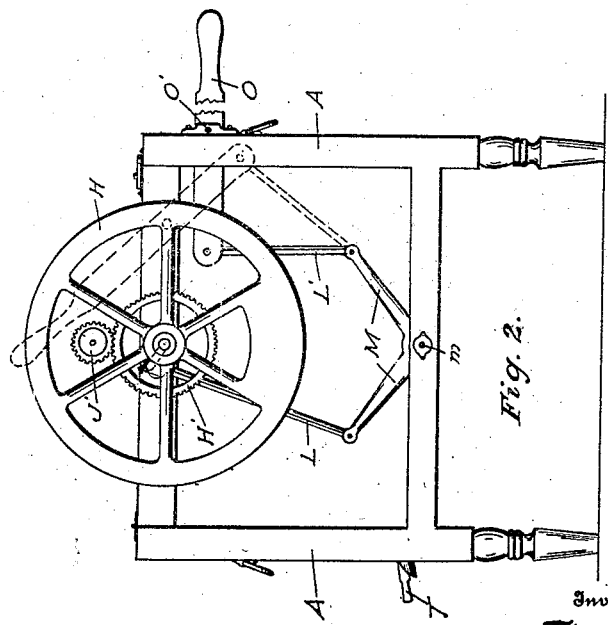
Witnesses
A. B. Cornelius
E. P. Gibbons
Inventor:
John Calvin Flowers
By Eugene Ayres,
Attorney

UNITED STATES PATENT OFFICE.

JOHN CALVIN FLOWERS, OF ST. JOSEPH, MISSOURI.

GEARING.

No. 864,126.  Specification of Letters Patent.  Patented Aug. 20, 1907.

Application filed January 26, 1907. Serial No. 354,256.

*To all whom it may concern:*

Be it known that I, JOHN CALVIN FLOWERS, a citizen of the United States, residing at St. Joseph, in the county of Buchanan and State of Missouri, have invented certain new and useful Improvements in Gearings; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of my invention is to provide a gearing which by its peculiar mechanism greatly lightens the burden of the operator. I accomplish my object by the mechanism illustrated in the accompanying drawings in which, Figure 1 is a longitudinal section of machine showing churn; Fig. 2 is an end elevation of machine showing operating gear.

Similar letters refer to similar parts in the several views.

A is the tub of the machine and B is a support for a wringer.

C is a folding leaf forming a rest for a basket to receive the clothes after being wrung. It is preferably so attached that when lowered, its inner edge passes slightly beneath the bottom of the machine pressing up against it and stopped by it in a horizontal position. Said leaf is provided with a hinged leg C′ to aid in supporting it when lowered.

The top of the tub consists of three hinged lids D D′ and D². d d are strips forming rests for said hinged lids D′ and D² when raised.

E is a vertical shaft having connection with a device F, shown in Fig. 1, which device is adapted to be driven by the gearing mechanism; it is carried by a cast iron socket d′ set rigidly in the top of lid D. E′ is a cog wheel set horizontally and rigidly fastened on the top of said shaft E.

H is a fly wheel on the inside of which a straight cog wheel H′ is cast or rigidly attached; this straight cog wheel revolves at all times with the fly wheel. The space between two of the spokes of said fly wheel is weighted as shown in Fig. 2 for the purpose of preventing said fly wheel stopping on its center.

I is a horizontal shaft supported on lid D² by upright brackets I′ I′. Shaft I carries at its inner end a beveled cog wheel, J, which meshes with cog wheel E′; at its outer end it carries a straight cog wheel J′ which meshes with cog wheel H′.

At the fly wheel end of said tub there is an extension forming a narrow chamber K. The top of the extension is provided with boxing in which fly wheel shaft, h, operates. This shaft is crooked as shown in Fig. 1. The upper end of a long rod L is carried in the crook of the fly wheel shaft, its lower end is pivotally attached to one end of bell crank lever M. Said bell crank lever is carried by a pin m which works in cast iron bearings in opposite sides of said chamber. The lower end of a short rod L′ is pivotally attached to the other end of the bell crank lever, its upper end engaging lever O.

It will be seen from the illustrations and descriptions of the lever and connecting mechanism that the operation of the device is reversible.

What I claim and desire to obtain by Letters Patent, is

A frame provided with an extension forming a side chamber, a vertical shaft in said frame, a horizontal cog wheel rigidly attached to the top of said shaft, a fly wheel crank shaft across the upper part of said chamber, a fly wheel weighted between two spokes to prevent said crank shaft stopping at its dead center, a straight cog wheel rigidly attached to the inner side of said fly wheel revoluble with said fly wheel on said crank shaft, a horizontal shaft and the brackets by which the shaft is supported on said machine, a beveled cog wheel on the inner end of said shaft adapted to mesh with said vertical shaft cog wheel, a straight cog wheel at the outer end of said horizontal shaft adapted to mesh with the straight cog wheel revoluble with said fly wheel, a bell crank lever supported pivotally at the bottom of said chamber, a long rod, the upper end of which is carried in the crook of said fly wheel shaft, its lower end connected pivotally with one end of the bell crank lever, a short rod, the lower end connected pivotally with the other end of the bell crank lever, a lever pivotally connected with the upper end of said short rod, substantially as set forth and shown.

In testimony whereof, I affix my signature, in presence of two witnesses.

JOHN CALVIN FLOWERS.

Witnesses:
 J. N. JOHNSON,
 EVANGELINE O. GIBBONS.